May 15, 1945.  R. J. DAVIES ET AL  2,375,977
PREPARATION OF ALUMINA FROM CLAY
Filed Nov. 3, 1942
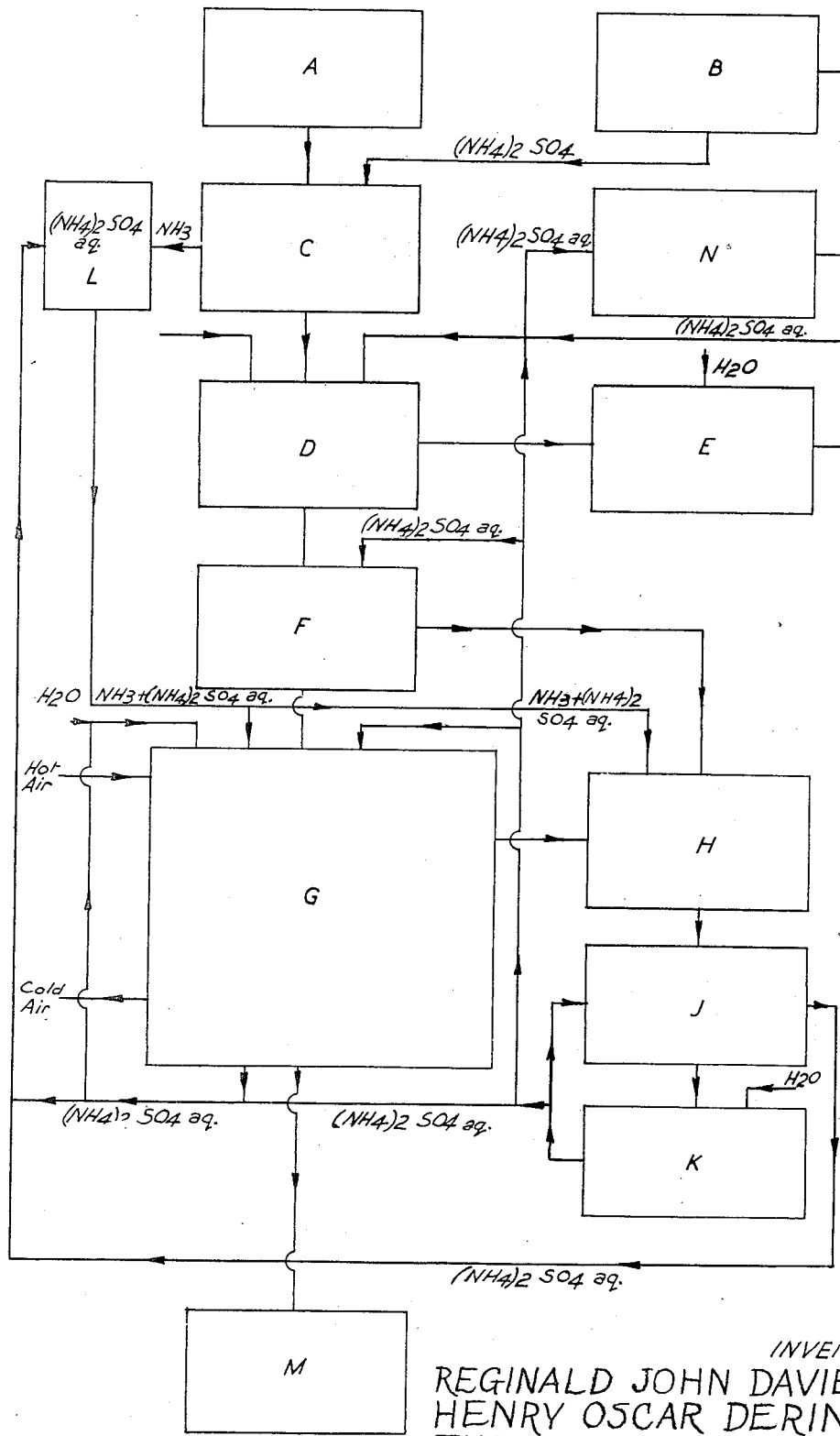
INVENTORS:
REGINALD JOHN DAVIES
HENRY OSCAR DERING
THOMAS WEBSTER PARKER
BY Haseltine, Lake & Co. ATTORNEYS

UNITED STATES PATENT OFFICE 2,375,977

PREPARATION OF ALUMINA FROM CLAY

Reginald John Davies, Henry Oscar Dering, and Thomas Webster Parker, St. Austell, England, assignors to English Clays, Lovering, Pochin & Company Limited, St. Austell, England, a British company Application November 3, 1942, Serial No. 464,417
In Great Britain December 1, 1939

4 Claims. (Cl. 23—143)

The present invention relates to a process for the production of alumina from clay or like material containing alumina in which a mixture of the clay or the like and ammonium sulphate is sintered whereby ammonia is evolved and alumina present in the clay is rendered soluble as ammonia alum or aluminium sulphate, from which the hydroxide is obtained by the action of ammonia reforming ammonium sulphate.

It is among the objects of the invention to obtain the alumina hydrate in the form of a granular, free-filtering mass which is freely permeable to the liquors used.

It is another object of the invention to obtain a high recovery of ammonia in the form of ammonium sulphate and to obtain all ammonium sulphate solutions in concentrated or saturated form so that the solid ammonium sulphate required for the sintering may be recovered with a minimum of evaporation operations.

It is another object of the invention to increase the efficiency of the sintering operation and in particular to reduce to a minimum the sublimation of ammonium sulphate and the decomposition of the ammonia evolved.

In prior processes of the type set forth, the decomposition of the ammonia alum has been effected in various ways. In one prior specification, it is proposed to place the ammonia alum crystals on a filter and wash them with cold water or a cold saturated solution of ammonia alum. The washed crystals are then exposed to the action of ammonia gas or ammonia solution and the ammonium sulphate extracted with water and recovered by crystallisation. According to another prior proposal, the crystals of ammonia alum are introduced into ammonia solution which is in excess of the actual quantity required and the aluminium hydroxide separated by filtration. According to yet another prior proposal, a solution of ammonium sulphate saturated with ammonia is passed through a moving layer of dry aluminium salt with suction devices arranged below. Various difficulties have been met with in all these prior processes. For instance, the ammonium sulphate has to be recovered by the evaporation of large quantities of weak solution with a correspondingly high cost. Again, it is the practice to conduct the reaction between the alum and the ammonia with an excess of ammonia, involving the cost of handling and drying the crystals and the danger of contamination and with the result that the final liquors contain an appreciable quantity of free ammonia which is either lost to the process or involves considerable expense in recovery. In the process according to the present invention, however, it is possible to recover the ammonium sulphate by evaporation of a concentrated solution and the liquor leaving the reaction vessel during the reaction contains no free ammonia.

According to the invention, a process for the preparation of alumina from clay or like material containing alumina of the type set forth, includes the step of passing a solution of ammonia through a stationary mass of damp ammonia alum crystals.

The process is preferably conducted by successively crystallising ammonia alum from aqueous solution, removing the supernatant layer of mother liquor, washing the mass of crystals with a solution of ammonium sulphate to displace mother liquor remaining in the mass and passing a solution of ammonium sulphate containing absorbed ammonia through the mass whereby the ammonia reacts with the alum to form alumina hydrate, ammonium sulphate and water, the solution of ammonium sulphate thus obtained being displaced through the unreacted part of the mass by the ammoniacal solution, it being obvious that the reaction zone must move gradually through the relatively thick stationary bed G, and that no alumina comes through with the ammonium sulfate until at the end.

The concentration of ammonium sulphate in the solution used to displace the mother liquor, and in the solution produced by the reaction, the latter consisting of the ammonium sulphate contained in the ammoniacal liquor plus that dissolved from the mass of alumina hydrate, should preferably be such that the solubility of the alum crystals in these solutions is small; it should not be less than 10 per cent., and preferably 20 per cent. and more. Suitable concentrations of ammonia are from 5 to 15 per cent., but concentrations greater or less than these may be employed. The concentrations of ammonium sulphate and ammonia in the ammoniacal solution may be adjusted so that the liquor leaving the mass during the reaction is a saturated solution of ammonium sulphate.

Ammonia alum is not completely insoluble in ammonium sulphate solution at normal temperature, so that a small part of the salt dissolves in the liquors. This ammonium sulphate solution saturated with aluminium sulphate is specially suitable for displacing the mother liquor from succeeding batches of crystals since it has no solvent action on the crystals.

The ammonia is completely removed from the ammoniacal solution by the reaction, and the liquor leaving the mass during the reaction possesses an acid reaction on account of the aluminium sulphate from the sparingly-soluble ammonia alum. Completion of the reaction is indicated by this liquor becoming alkaline.

Excess ammoniacal liquor may be displaced and the alumina hydrate washed free from sulphates by passing dilute ammonia solution and water through the mass. The hydrate cannot be washed completely free from sulphate with water but washing with dilute ammonia solution is effective. A suitable concentration is 0.5 per cent of ammonia. The final wash may be with water only.

The process may be carried out in any suitable vessel. Preferably this should be covered and have a perforated false bottom over which wire gauze or other material adapted to retain the crystals may be placed.

The alumina hydrate may be dried in situ by passing hot air through the mass. In working with large reaction vessels, however, where considerable resistance is offered to the flow of the hot air through the mass, it may be desirable to remove the alumina hydrate from the reaction vessel and filter and dry by known methods.

The operations of washing the alum crystals to remove mother liquor, effecting the reaction between the alum crystals and ammonia to give alumina hydrate and ammonium sulphate, washing the alumina hydrate and drying the alumina hydrate by means of a current of hot air, can be conducted in a single reaction vessel without disturbing the contents, although, as previously explained, it may be desirable to remove the hydrate to dry it.

The above described method of conducting the reaction between the ammonia and ammonia alum may be incorporated in a continuous or cyclic process.

Thus, a continuous or cyclic process for the production of alumina from clay or other material containing alumina, comprises the steps of successively sintering a mixture of clay and ammonium sulphate under conditions whereby ammonia is evolved and alumina present in the clay is rendered soluble as ammonia alum, extracting the sintered mass in hot ammonium sulphate solution, separating the undissolved solids, cooling the solution and crystallising substantially iron-free ammonia alum, filtering the crystals and passing a solution of ammonium sulphate containing absorbed ammonia through a stationary mass of the crystals whereby the ammonia alum is converted to alumina hydrate and ammonium sulphate, the ammonium sulphate solution used in the process being derived from the initial mixture of clay and ammonium sulphate and the ammonium sulphate being almost completely recovered from a concentrated solution thereof and re-cycled for sintering a fresh charge of clay.

An important feature of the invention is that the ammonium sulphate is recovered by the evaporation of a concentrated solution. This is accomplished by the reuse of the dilute liquors, the concentration of which is thereby increased, and by the manner of conducting the reaction between the ammonia and ammonia alum so as to increase the concentration of the stronger liquors, whereby ammonium sulphate may be recovered by evaporation of a saturated or nearly saturated solution.

In washing the ammonia alum crystals to remove iron-containing mother liquor, a concentrated solution of ammonium sulphate saturated with aluminium sulphate is employed in order to avoid dissolving a portion of the crystals, since ammonia alum is slightly soluble at normal temperatures in even saturated ammonium sulphate solution. This solution is obtained from the reaction between the ammonia and ammonia alum, a portion of the liquor obtained in each cycle of operations being employed to wash the crystals formed in a subsequent cycle.

The mass of alumina hydrate and ammonium sulphate may be washed with water or weak ammonium sulphate liquor containing a small quantity of free ammonia, by which means the alumina hydrate may be washed substantially free from ammonium sulphate in a shorter time and with the passage through the mass of less water and weak liquor than is the case in the absence of ammonia. In other words, efficiency of washing the alumina hydrate is increased by maintaining a small quantity of free ammonia in the mass during the washing.

An advantageous method of carrying out a continuous or cyclic process according to the invention will now be more fully described by way of example, but it is to be understood that not all the steps described are essential and that the steps themselves may be modified without departing from the spirit of the invention.

(1) A mixture of 1 part clay and 1½ to 3 parts ammonium sulphate by weight is sintered at 350 to 550 degrees centigrade. Ammonia is evolved during the sintering and the clay is decomposed by the action of the acid sulphate, whereby a large part of the alumina contained in the clay is rendered soluble in the form of ammonia alum, the completion of this reaction being normally indicated by a cessation in the evolution of free ammonia. The sintering is preferably conducted in a continuous-type furnace in which there is a continuous entry and discharge of the raw and sintered mixture, respectively, thereby providing a continuous and regular evolution of ammonia. Sublimation of ammonium sulphate and decomposition of the ammonia evolved can be reduced to a minimum if there is no direct flow of air through the furnace. Such direct flow of air is therefore preferably avoided and the ammonia evolved allowed to escape under its own vapour pressure. If desired, the passage of ammonia from the sintering furnace may be assisted by a slightly reduced pressure or partial vacuum in the offtake.

(2) The sintered mass is extracted in hot ammonium sulphate solution, and the insoluble matter is filtered off and washed with water to remove the aluminium and ammonium sulphates. Preferably dilute ammonium sulphate solution is employed for the extraction to avoid raising the temperature at which the extraction and filtration must be conducted to prevent crystallisation of ammonia alum. Suitable liquor is provided by the water used in washing the insoluble matter in a previous extraction and the water used in washing the hydroxide sludge in step 5, thereby recovering the sulphates contained in the wash water, together with the liquor of moderate concentration obtained by washing the alumina hydrate in step 7.

(3) In the hot, clear solution thus obtained, the ferric sulphate may be reduced to ferrous sulphate by the addition of a reducing agent, such as for example, sulphur dioxide or a sulphite. It is preferred to add at least a portion of the reducing agent during the extraction step 2, whereby the time required to complete the reduction in the clear liquor may be substantially reduced.

(4) To the solution from step 3 concentrated ammonium sulphate solution is added, the resulting liquor cooled, whereupon substantially iron-free ammonia alum crystallises from solution, and the crystals are washed with a further quantity of the concentrated ammonium sulphate solution to remove the iron-containing mother liquor. The ammonium sulphate solution used is the nearly saturated liquor obtained during the reaction in step 6 which is saturated with aluminium sulphate. A large proportion of the aluminium sulphate is recovered from the liquor in the form of ammonia alum crystals since this salt is only sparingly soluble when cold in the presence of the ammonium sulphate. Further by using the solution of ammonium sulphate saturated with aluminium sulphate to wash the crystals free from mother liquor no dissolving of the crystals takes place and loss of ammonia alum is avoided.

(5) The mother liquor from step 4 is neutralised by the addition of ammonia, thereby precipitating iron and aluminium hydroxides, air may be caused to bubble through the liquor to oxidise the iron hydroxide, and the liquor filtered to remove the sludge and obtain a clear solution of ammonium sulphate. Partial neutralisation and oxidation may be secured by passing the air leaving the ammonia absorber (step 6) through the mother liquor, which thus serves as a trap for traces of ammonia which may escape from the absorber. The neutralisation is completed by the addition of ammonia solution from the absorber and the passage of further air to complete the oxidation. The hydroxide sludge is washed with water to recover the entrained ammonium sulphate and the wash water may be added to the purified mother liquor or used in the sinter extraction (step 2).

(6) The ammonia from step 1 is absorbed in a solution of ammonium sulphate, and the solution is passed through a mass of damp ammonia alum crystals from step 4, whereupon the ammonia reacts with the ammonia alum to form alumina hydrate and ammonium sulphate. The ammonium sulphate solution used for the absorption of the ammonia may be drawn from the purified mother liquor from step 5 and the more concentrated washings from step 7. The concentration of ammonia and ammonium sulphate should preferably be such that the liquor leaving the mass of crystals is saturated with ammonium sulphate. As a result of the slight solubility of ammonia alum in strong ammonium sulphate liquor the solution dissolves a small quantity of alum in its passage through the mass of unreacted crystals and accordingly possesses slightly acid reaction. Completion of the reaction is marked by a change in the reaction of the solution leaving the mass from slightly acid to alkaline (ammoniacal).

(7) The alumina hydrate is washed substantially free from ammonium sulphate by means of weak ammonium sulphate solution containing a small quantity of ammonia, weak ammonia solution, and water. The presence of ammonia in the wash water increases the efficiency of washing, so that the washing is completed in a shorter time and with less water than is possible in the absence of ammonia.

At the commencement of washing weak ammonium sulphate liquor obtained from washing previous batches of alumina hydrate and which thereby contains a trace of ammonia is used, followed by water to which a small quantity of ammonia has been added, and finally water only. The concentration of the ammonium sulphate solution leaving the vessel falls rapidly as washing proceeds and after removing the more concentrated solution to be used in the ammonia absorber (step 6) and extracting the sinter as in step 2 the remaining dilute liquor is suitable for use in commencing the washing of subsequent charges of alumina hydrate.

(8) The alumina hydrate may be dried by a current of hot air passed through the reaction vessel. This method of drying the hydrate has the advantage that handling of the hydrate is avoided and the tendency for the particles to break down is greatly reduced, so that a coarser grained hydrate containing less dust is obtained. The dying in situ also greatly reduces the danger of contamination taking place. The hot air used for the drying may be obtained economically by utilising the waste heat from the flues of the sintering and calcining furnaces.

(9) The alumina hydrate may be calcined to anhydrous alumina at a temperature of 1200° to 1500° centigrade in known manner.

(10) The concentrated solution of ammonium sulphate from step 6 containing a small quantity of aluminium sulphate, excepting such portions of the solution as are used again in the process, is evaporated, and the salt returned to the next charge of clay for the repetition of step 1. The presence in the salt of the small quantity of aluminium sulphate does not introduce any difficulties into the continuous cyclic use of the ammonium sulphate, since anhydrous ammonia alum is the end product of the reaction with clay in step 1.

The manner in which the various solutions and reactants used in the process are recycled will be clearly understood from the accompanying diagrammatic flow sheet.

The clay and ammonium sulphate are introduced from hoppers A and B respectively, into the furnace C. The sintered mass is washed with hot ammonium sulphate solution in an extractor D and the insoluble matter filtered off and washed in E. The ammonia alum crystals are formed in a crystalliser F. The crystals are then transferred to the main reaction vessel G. The mother liquor from the crystalliser F is passed to a vessel H where it is neutralised and filtered to remove the sludge and obtain a clear solution of ammonium sulphate. The ammonium sulphate solution is passed to a vessel J while the sludge is passed to a vessel K.

The ammonia evolved during the sintering operation is passed into a solution of ammonium sulphate contained in an absorber L.

The washing of the alum crystals, the reaction between the alum crystals and ammonia and the washing and drying of the alumina hydrate may all take place in the main reaction vessel G.

The alumina hydrate is calcined to anhydrous alumina in known manner in the furnace M.

The concentrated solution or ammonium sulphate obtained as the result of the operations conducted in the main reaction vessel G is passed to the evaporator N and the salt recovered therein returned to the ammonium sulphate hopper B.

The course of the various reactants between the reaction vessels will be apparent from the flow sheet in conjunction with the foregoing description of the various steps of the process.

The re-use in the process of the various liquors, and the method of conducting the reaction between the ammonia and ammonia alum, enables the ammonium sulphate to be recovered in the form of a saturated or nearly saturated solution, thereby reducing the cost of evaporation to a minimum. To secure this result the quantity of fresh water introduced into the cycle of operations must balance the quantity of water removed from each cycle, otherwise the excess water can only be removed by evaporation or by discarding weak solutions with a consequent loss of ammonium sulphate. Water is introduced into the cycle by the combined water of the clay, and in washing the insoluble silica (step 2), the hydroxide sludge (step 5) and the alumina hydrate (step 7). The difference between this quantity of water and that which accompanies the silica and hydroxides in their removal from the cycle, together with the water evaporated in drying and calcining the alumina hydrate, represents the quantity of water to be evaporated in recovering the ammonium sulphate. In operating the process as described above it is found that the quantity of water to be evaporated to preserve this balance does not exceed the amount required to give a saturated solution of the ammonium sulphate.

A further important feature of the process is that the following operations (steps 4, 6, 7 and 8) may be conducted in one reaction vessel without disturbing the contents:

Filtering and washing alum crystals to remove iron-containing mother liquor (4).
Reaction between ammonia alum crystals and ammonia to give alumina hydrate and ammonium sulphate (6).
Washing alumina hydrate substantially free from ammonium sulphate (7).
Drying alumina hydrate by means of a current of hot air (8).

As previously explained, in working with large reaction vessels it may be necessary to conduct step 8 in a separate vessel.

The principal advantages of conducting these three or four consecutive steps of the process in situ are:

The cost of handling the material between and during the steps is eliminated; losses of free ammonia during the reaction between the ammonia and the ammonia alum crystals are avoided; the danger of contamination is greatly reduced (for many of the uses of alumina, e. g., in the reduction to aluminium metal, a high order of purity is essential).

What we claim and desire to secure by Letters Patent of the United States is:

1. A process for converting ammonium alum to granular alumina which comprises passing a solution of ammonium hydroxide and ammonium sulfate through a relatively thick stationary bed of ammonium alum crystals from one side to the other, the thickness of the mass and the rate of introduction of the ammonia solution being so adjusted that the reaction proceeds in a zone which gradually advances from the inlet side of the mass to the outlet side, whereby a concentrated solution of ammonium sulfate containing only a small amount of dissolved alum and free from colloidal alumina is obtained at the outlet until the reaction is completed.

2. A process for the production of alumina from alumina containing material comprising the steps of successively sintering a mixture of clay and ammonium sulfate under conditions whereby ammonia is evolved and alumina present in the clay is rendered soluble as ammonia alum, extracting the hot mass in hot sulfate solution, separating the undissolved solids, cooling the solution and crystallizing subtantially iron free ammonia alum, filtering the crystals, assembling said crystals in a relatively thick stationary bed, passing a solution of ammonium hydroxide and ammonium sulfate from one side of the bed to the other, the thickness of the mass and the rate of introduction of the ammonia solution being so adjusted that the reaction proceeds in a zone which gradually advances from the inlet side of the mass to the outlet side, whereby a concentrated solution of ammonium sulfate containing only a small amount of dissolved alum and free from colloidal alumina is obtained at the outlet until the reaction is complete, the ammonium sulfate used in the various steps of the process, once having been brought into the process in an initial mixture of clay and ammonium sulfate, being substantially recovered and recycled in the process for sintering a fresh charge of clay.

3. A process according to claim 2 in which the ammonium sulfate is separated from the mass of alumina hydrate and ammonium sulfate, and the alumina is dried in situ by passing hot air through the mass.

4. A process according to claim 2 in which the concentrated ammonium sulfate obtained previously as the result of the reaction between the ammonia alum and the ammonium hydroxide, is added to the ammonia alum solution to increase the concentration of ammonium sulfate therein, before the ammonia alum is cooled to crystallize the ammonia alum.

REGINALD JOHN DAVIES.
HENRY OSCAR DERING.
THOMAS WEBSTER PARKER.